No. 842,293. PATENTED JAN. 29, 1907.
J. AMTMANN.
PRESERVED FOOD TIN.
APPLICATION FILED OCT. 11, 1905.
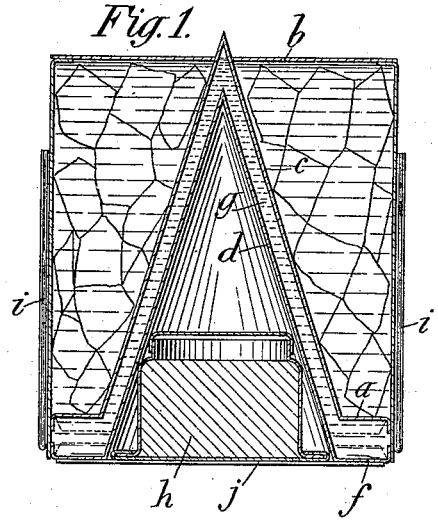
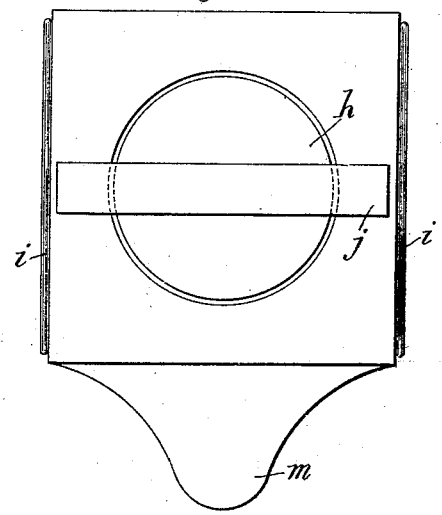
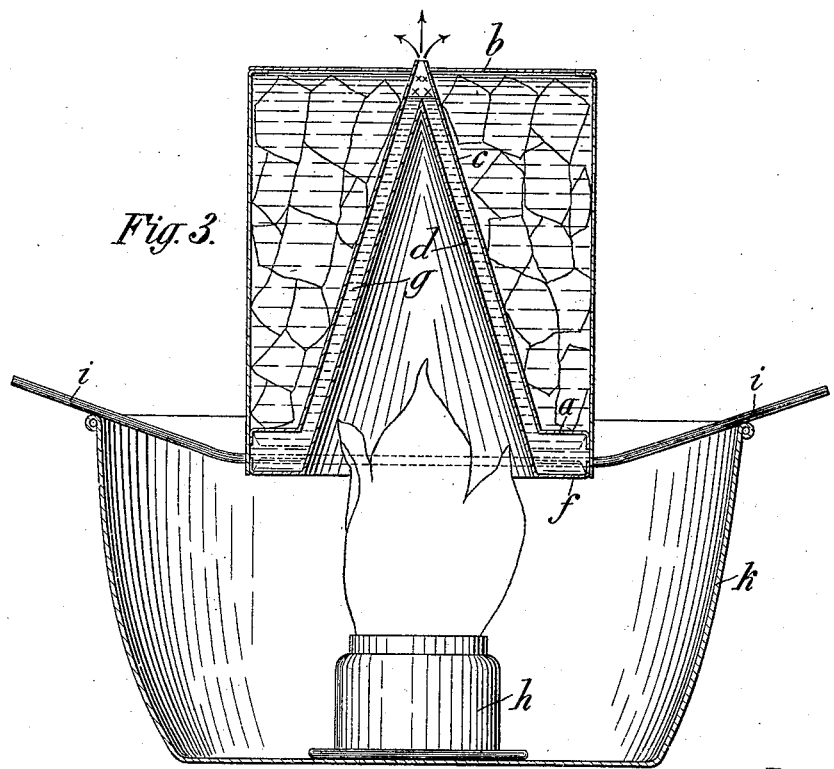
Witnesses.
John C. Seifert
H. Fleischer
Inventor:
Josef Amtmann
per F. H. Richards,
Attorney.

UNITED STATES PATENT OFFICE.

JOSEF AMTMANN, OF MELK, AUSTRIA-HUNGARY, ASSIGNOR OF ONE-HALF TO ZDENKO VON PUTEANI, OF MELK, AUSTRIA-HUNGARY.

PRESERVED-FOOD TIN.

No. 842,293.  Specification of Letters Patent.  Patented Jan. 29, 1907.

Application filed October 11, 1905. Serial No. 282,285.

*To all whom it may concern:*

Be it known that I, JOSEF AMTMANN, a subject of the Emperor of Austria-Hungary, residing in Melk-on-the-Danube, in the Province of Lower Austria and Empire of Austria-Hungary, have invented certain new and useful Improvements in Preserved-Food Tins, of which the following is a specification.

My invention relates to the usual cylindric or square tins wherein preserved food is shipped; and it has for its purpose better to adapt the said tins for having their contents heated. The usual methods of heating such tins consist in either immersing the tin in hot water or in subjecting it to the direct action of a flame. In each case a comparatively long time is required to heat the contents of the tins to the center, and when subjected to the direct action of a flame there is the liability of burning the portions of food adjacent to the bottom or sides of the tins.

My invention has for its object to overcome this difficulty.

To this end the bottom of the tin is provided with a central conical recess protruding to a small extent through the top of the tin, which recess is provided with double sides forming a water-chamber. The protruding upper end of the water-chamber is closed, but must be perforated or cut away before the can is subjected to heat in order to allow water and steam to escape. For heating the tin it is placed upon a support which allows a free space for the heating-flame.

In some cases the tin is provided with legs or arms of pliable wire to form a stand or support. A spirit-lamp for heating may advantageously be carried in the recess in the tin.

In the annexed sheet of drawings, Figure 1 is a sectional elevation of a tin the bottom of which is provided with a double-sided conical recess containing a receptacle for solidified spirit. Fig. 2 is an under side view of the tin, and Fig. 3 is a sectional elevation of the tin supported, by means of its soldered wire legs, upon the edge of a soldier's mess-tin and having the spirit-lamp burning under it.

It will be seen from Figs. 1 and 2 that the bottom $a$ of the preserved-food tin is provided with a central circular perforation which is closed by a sheet-metal cone $c$, protruding to a small extent through the top or cover $b$ of the tin. At a small distance from the bottom proper, $a$, of the tin a second bottom $f$ is arranged, likewise having a central circular perforation and an upwardly-extending sheet-metal cone $d$, closing the said perforation. The two bottoms $a$ and $f$ and the two sheet-metal cones $c$ and $d$ encompass a chamber $g$, which is filled with water, to which substances may be added for preventing it from putrefying and freezing. In Figs. 1 and 2 of the drawings a receptacle $h$ for solidified spirit is shown inserted into the hollow space of the inner cone $d$ and kept in place therein by a soldered sheet-iron strip $j$.

The V-shaped wires $i$, soldered to the tin, are intended to be bent sideward in order to form legs or carriers by means of which the tin can be placed upon suitable supports, such as stones or the sides of a mess-tin $k$, in such a manner that the necessary space for the spirit-receptacle $h$ is kept free below the tin. Before kindling the spirit the point of the sheet-metal cone $c$ is cut away or pierced in order to allow the water expanded by the heat and afterward the steam to escape.

It is obvious that the conical sheet-metal sides may be replaced by sides of different shape—for instance, cylindrical or spheroidal ones—obtained from sheet metal by the drawing process, in which case a thin tube must extend from the top of the upper side of the water-chamber through the top of the tin and have its end sealed by solder.

$m$ is a sheet-metal flap destined to be seized by the key for opening the tin.

What I claim, and desire to secure by Letters Patent of the United States, is—

1. In a preserved-food tin, the combination with lateral sides and a top having the usual form, of a double-sided bottom having a central recess, a sealed extension of the upper side of the recess protruding through the top of the tin, and a water filling in the hollow space between the double sides, substantially as and for the purpose described.

2. In a preserved-food tin, the combination with lateral sides and a top having the usual form, of a double-sided bottom having a central recess, a sealed extension of the upper side of the recess protruding through the top of the tin, a water filling in the hollow space between the double sides, and a fuel-receptacle inserted into the recess, substantially as and for the purpose set forth.

3. In a preserved-food tin, the combination with lateral sides and a top having the usual form, of a double-sided bottom having a central recess, a sealed extension of the upper side of the recess protruding through the top of the tin, a water filling in the hollow space between the double sides, and pliable wires secured to the lateral sides, substantially as and for the purpose described.

In witness whereof I have signed this specification in presence of two witnesses.

JOSEF AMTMANN.

Witnesses:
   VICTOR KEUPT,
   ZDENKO FREIHERR VON PUTEANI.